United States Patent
Krishnamurti et al.

(10) Patent No.: US 6,300,427 B1
(45) Date of Patent: Oct. 9, 2001

(54) INHIBITING SCALE IN VINYL MONOMER POLYMERIZATION

(75) Inventors: Ramesh Krishnamurti, Williamsville; Sandor Nagy; Qi Wang, both of Grand Island; Bib Hichri, Williamsville, all of NY (US)

(73) Assignee: Occidental Chemical Corporation, Dallas, TX (US)

( * ) Notice: Subject to any disclaimer, the term of this patent is extended or adjusted under 35 U.S.C. 154(b) by 0 days.

(21) Appl. No.: 09/477,104

(22) Filed: Jan. 4, 2000

Related U.S. Application Data

(62) Division of application No. 09/131,347, filed on Aug. 10, 1998, now Pat. No. 6,114,476.

(51) Int. Cl.[7] .................................................... C08F 2/20
(52) U.S. Cl. ......................... 525/502; 528/158; 525/144; 526/62; 526/208
(58) Field of Search .................................. 528/154, 158; 525/502, 144; 526/208, 62

(56) References Cited

U.S. PATENT DOCUMENTS

| | | | |
|---|---|---|---|
| 3,969,244 | * | 7/1976 | Kobayashi et al. ............... 210/38 B |
| 4,431,783 | * | 2/1984 | Walker et al. ......................... 526/62 |
| 5,574,115 | * | 11/1996 | Shimizu et al. ....................... 526/62 |
| 6,001,937 | * | 12/1999 | Krishnamorti et al. ............... 526/74 |

FOREIGN PATENT DOCUMENTS

| | | | |
|---|---|---|---|
| 0042725 | * | 12/1981 | (EP) . |
| 56-14506 | * | 2/1981 | (JP) . |

* cited by examiner

*Primary Examiner*—Peter F. Kulkosky
(74) *Attorney, Agent, or Firm*—Richard D. Fuerle; Anne E. Brookes

(57) ABSTRACT

Disclosed is a method of inhibiting the formation of scale on reactor surfaces in contact with a polymerizing vinyl monomer comprising contacting said monomer with a terpolymer which comprises the condensation reaction product of (A) an aromatic compound that contains the group

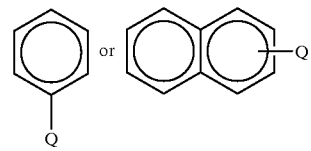

where Q is OR or SR and R is hydrogen, alkyl from $C_1$ to $C_{15}$, or aryl, alkaryl, or aralkyl from $C_6$ to $C_{15}$:

(B) about 0.1 to about 10 moles of a carbonyl compound per mole of said aromatic compound; and (C) about 0.1 to about 10 moles of a thiourea per mole of said aromatic compound.

20 Claims, No Drawings

INHIBITING SCALE IN VINYL MONOMER POLYMERIZATION

This application is a division of application Ser. No. 09/131,347, filed Aug. 10, 1998, now U.S. Pat. No. 6,114,476.

BACKGROUND OF THE INVENTION

This invention relates to a method of inhibiting the formation of scale on reactor surfaces that are in contact with polymerizing vinyl monomers. In particular, it relates to the use of a terpolymer, which is the condensation reaction product of an aromatic compound, a carbonyl compound, and a thiourea, for that purpose.

When vinyl monomers are polymerized, scales of the polymer adhere to the reactor walls and to reactor components, such as stirrers. The deposition of this scale reduces the yield of the polymer, reduces heat transfer efficiency during heating and cooling of the reactor, and lowers monomer efficiency and general process control. Some of the scale flakes off during polymerization of the monomer and mixes with the rest of the polymer, which makes the polymer less processable and reduces its quality. For example, when vinyl chloride monomer (VCM) is polymerized, scales of polyvinyl chloride (PVC) can flake off and form "fish eyes" in the PVC.

Cleaning the reactor to remove this scale is normally required after each batch, resulting in considerable reactor downtime as well as increased cost in producing the polymer. Because VCM can become entrapped in the scale, the physical removal of the scale by an operator could result in the exposure of the operator to the harmful monomer.

EP 343,706 teaches that polythioureas of the general formula [NHRNHC(S)]n (where R is an arylene group substituted by a carboxylic acid group) can be used to reduce scale formation in vinyl chloride polymerization reactors. JP 01,217,016 discloses a scale preventing compound comprising an alkali metal xanthogenate, polyethyleneimine, and a dialdehyde. In JP 59,32,482, dithiocarboxylic acids or salts containing OC(=S)S or NC(=S)S groups and/or (RO)2P(S)SR derivatives are disclosed as scale preventing agents. U.S. Pat. No. 4,431,783 discloses that naphthol/formaldehyde condensates formed by a base-catalyzed process are effective scale-preventing agents vinyl chloride polymerization reactors. While many of these scale prevention agents are effective in preventing scale, they can alter the color of the resulting PVC, giving it a yellowish tinge. Customers of high quality PVC prefer a pure white or colorless PVC and regard any color in the PVC as an indication of inferior quality.

SUMMARY OF THE INVENTION

We have discovered a scale prevention agent for use in the polymerization of VCM and other vinyl monomers that is very effective in preventing the formation of scale on reactor components that come in contact with the VCM. Because there is little or no scale, there are fewer fish eyes.

The scale prevention agent of this invention is a terpolymer of an aromatic compound, a carbonyl compound, and a thiourea derivative. It is easily prepared from commercially available, inexpensive, non-toxic materials and can be applied in an aqueous medium, thereby avoiding the use of potentially harmful and flammable organic solvents. Quite unexpectedly, the scale preventing agent of this invention does not impart any color to the resulting PVC.

DESCRIPTION OF THE PREFERRED EMBODIMENTS

The terpolymer used in the process of this invention is the condensation reaction product of an aromatic compound, a carbonyl compound, and a thiourea. The aromatic compound contains the group:

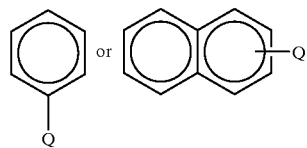

where Q is OR or SR and R is hydrogen, alkyl from $C_1$ to $C_{15}$, or aryl, alkaryl, or aralkyl from $C_6$ to $C_{15}$. The Q group is preferably OR and the R group is preferably hydrogen as phenols are more readily available and work well. Preferred aromatic compounds include:

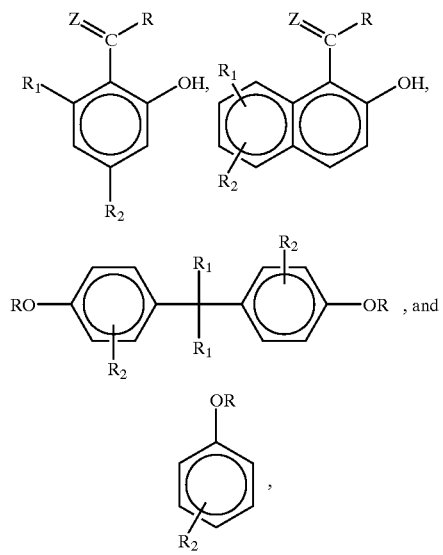

where Z is O or NOH, each $R_1$ is independently selected from OH, R, $SO_3R$, and $CO_2R$, and each $R_2$ is independently selected from $R_1$, SH, SR, haloalkyl from $C_1$ to $C_{15}$, and alkoxyaryl, naphthyl, and polycyclic aryl from $C_6$ to $C_{15}$. Examples of suitable aromatic compounds include salicylic acid, 1-naphthol, thiosalicylic acid, hydroxybenzenesulfonic acid isomers, 4-hydroxybenzoic acid, 2'-hydroxypropiophenone oxime, and 2'-hydroxypropiophenone; 2'-hydroxypropiophenone and 1-naphthol are preferred due to their low cost, low toxicity, and good performance in the terpolymer condensate. Mixtures of the aromatic compounds can also be used.

The carbonyl compound can be an aliphatic mono or dialdehyde, an aromatic aldehyde, or an aliphatic mono or diketone. Compounds, such as trioxane, that form the carbonyl compound under the reaction conditions are also contemplated. Preferred carbonyl compounds have the general formula:

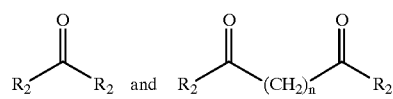

where each $R_2$ is independently selected as hereinabove defined and n is an integer from 1 to 10. Examples of suitable carbonyl compounds include acetaldehyde, glyoxal, benzaldehyde, dialkyl ketones such as acetone and methyl ethyl ketone, diaryl ketones such as benzophenone and ring-hydroxylated and sulfonated benzophenones, alkyl aryl ketones such as acetophenone, ring-hydroxylated acetophenones, and ring-sulfonated acetophenones, and formaldehyde and oligomers thereof, such as trioxane. Preferably, the carbonyl compound is formaldehyde or an oligomer thereof as those compounds have low cost, high reactivity, and are readily available. Mixtures of carbonyl compounds are also contemplated.

The thiourea has the general formula

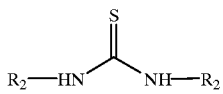

where each $R_2$ is independently selected from $NH_2$ and the hereinabove definition. Examples of suitable thioureas include thiourea, thiocarbamide, monomethyl thiourea, 1,3-dimethyl-2-thiourea, 1-phenyl-2-thiourea, semicarbazide, thiosemicarbazide, and thiocarbohydrazide. The preferred thioureas are thiourea and thiosemicarbazide because they work the best, are inexpensive, and are readily available. Mixtures of thioureas can also be used.

The terpolymer is made by preparing a mixture of its three components. For every mole of the aromatic compound, about 0.1 to about 10 moles of the carbonyl compound and about 0.1 to about 10 moles of the thiourea can be used. If less than 0.1 moles of the carbonyl compound is used, the terpolymers produced will have a lower molecular weight than desired, and if more than 10 moles of the carbonyl compound is used, the terpolymer will have low solubility. If less than 0.1 moles of the thiourea is used, the terpolymer will be less effective in preventing scale formation and, if more than 10 moles of the thiourea is used, the terpolymer will be less soluble. Preferably, for each mole of the aromatic compound, about 0.1 to about 5 moles of the carbonyl compound and about 0.1 to about 5 moles of the thiourea are used.

The condensation reaction of the terpolymer components is carried out in an acidic medium which also acts as the catalyst. Mineral acids, such as hydrochloric acid and sulfuric acid, and organic acids, such as acetic acid, can be used. The strength of the mineral acid can vary in the range of about 1M to about 6M. Typically, about 50 to about 500 wt % of a catalyst is used, based on the total weight of the terpolymer components.

The condensation reaction of the terpolymer components can be performed in water or polar organic solvent such as an alcohol (e.g., methanol, ethanol, propanol), a ketone (e.g., acetone, methyl ethyl ketone), an ester (e.g., ethyl acetate), or a dipolar aprotic solvent, such as sulfolane, tetrahydrofuran, N,N-dimethylformamide, N-methylpyrrolidone, cyclohexanone, dimethoxyethane, or diethyleneglycol dimethyl ether. Water is the preferred solvent because it is nonflammable and is not hazardous to the operator. Mixed solvent systems comprising combinations of solvents, including combinations of organic solvents with water, can also be used. It is preferable to choose a solvent system such that the terpolymer product, once it is formed, is insoluble in the solution and precipitates.

The preparation of the terpolymer is described in the Indian Journal of Chemistry, Vol 22A, pages 117 to 119, (1983), herein incorporated by reference. Typically, the aromatic compound, the carbonyl compound, and the thiourea taken together constitute from about 5 to about 50 wt % of the reaction system weight. The reaction can be effected by heating to temperatures of up to 150° C. for up to 8 hours. Once the terpolymer has been prepared, it can be collected and purified if desired.

Various other components can be mixed with the terpolymer to enhance its performance as an anti-fouling agent. For example, about 10 to about 500 wt % of an inorganic binder can be included as part of the scale prevention composition to increase the binding of the terpolymer to the reactor surfaces. Examples of suitable inorganic binders include colloidal silica and alumina, titanium (IV) oxide, zirconium (IV) oxide, aluminum hydroxide, vanadium (V) oxide, and sodium silicate. The preferred inorganic binder is colloidal silica because of its low cost and good performance.

About 1 to about 100 wt % are a surface active agent can also be included as part of the scale prevention composition to increase its adhesion to the reactor surfaces. Examples of suitable surface active agents include poly(vinyl acetate) (PVA) of varying degrees of hydrolysis, hydroxyethyl cellulose, hydroxypropyl cellulose, phytic acid, poly(vinyl formal), and gelatin. The preferred surface active agent is PVA of varying degrees of hydrolysis because of its low cost and good performance.

Generally, the scale prevention composition is prepared by mixing a solution of the terpolymer, surface active agent, and the inorganic binder. If the scale prevention composition is to be applied to the surfaces of the reactor, a solvent is included, forming a solution of about 0.001 to about 20 wt % solids. Solutions of less solids are less effective and solutions of more solids inhibit the polymerization of the VCM. Preferably, the solution contains about 0.01 to about 5 wt % solids. Solvents that can be used to form the coating solution include, for example, water, alkaline water, and various organic solvents such as methylene chloride, tetrahydrofuran, dimethyl formamide, dimethylsulfoxide, and alcohols such as methanol and ethanol. The preferred solvent is a caustic solution of, for example, about 10 wt % or less sodium hydroxide, as it has been found to work well; other inorganic bases such as KOH, LiOH, and $Ca(OH)_2$ are also expected to work well.

The terpolymer can be applied to the reactor walls and to reactor components that are in contact with the VCM by any suitable means including, for example, spraying, flooding, painting, and brushing. After the application, it is not necessary to evaporate the solvent from the coating composition. Generally, the solids content of the coating on the reactor walls and components should be about $1 \times 10^{-5}$ to about $1 \times 10^{-3}$ g/square inch (about $1.6 \times 10^{-6}$ to about $1.6 \times 10^{-4}$ g/cm$^2$) as less may not be effective and more is unnecessary.

The terpolymer can also be added directly to the polymerization composition. For emulsion polymerizations, the polymerization composition typically consists of water, vinyl monomer, a free radical initiator, and an emulsifier. For suspension polymerizations, the polymerization composition typically consists of water, vinyl monomer, a free radical initiator, and a suspending agent. Generally, about 0.0001 to about 0.01 wt % of the terpolymer is added to the polymerization composition, based on the weight of the monomer. Less terpolymer is ineffective and more terpolymer may inhibit polymerization of the monomer.

The terpolymer of this invention can also be used in gas phase or bulk polymerizations of vinyl monomers. But the present invention is particularly suitable for polymerizations in an aqueous medium, such as suspension or emulsion polymerization. The terpolymer can be used in both continuous and batch polymerizations.

The following examples further illustrates this invention.

EXAMPLES 1 to 21
Preparation of Resins

Into a 100 mL flask was placed the aromatic compound and the thiourea followed by the carbonyl compound. Unless otherwise stated, all reactions were carried out using 1.2 mL of 2M HCL/mmol of the carbonyl compound as the catalyst/solvent. The heterogeneous mixture was heated to reflux. After refluxing for a total of 5 hours, the reaction mixture was filtered and the solids were washed thoroughly with hot water. The wet filter cake was dissolved in 5 wt % aqueous sodium carbonate solution and acidified with 50% (v/v) HCL until the pH of the solution was about 1. A copious amount of solid resulted which was filtered, washed with water, and air dried. This procedure was used to prepare various terpolymer resins as described in Table 1.

EXAMPLE 22 (Comparative)

A commercial sample of "EVICAS-90" coating solution supplied by European Vinyls Corporation was used as such in vinyl chloride polymerization.

EXAMPLE 23 (Comparative)

A 1-naphthol/formaldehyde condensate was prepared as described in Example 1 of U.S. Pat. No. 4,431,783. The product was a deep blue aqueous sodium hydroxide solution of the condensate.

Polymerization of Vinyl Monomers

The following methods were used to carry out vinyl chloride polymerization in the suspension mode in the presence of the various scale prevention agents of this invention. By a proper choice of emulsifying agent and reaction apparatus, one can also carry out vinyl chloride polymerization in the emulsion mode.

EXAMPLE 24

Suspension Polymerization of Vinyl Chloride, General Procedure

TABLE 1

| Ex# | Aromatic compound (g) | Carbonyl compound (g) | Thiourea Derivative (g) | Product Appearrance; yield (g, %) |
|---|---|---|---|---|
| 1 | Salicylic acid (6.91) | Trioxane (9) | Thiourea (3.81) | Off-white solid; 7.0, 59 |
| 2 | 2'-Hydroxyacetophenone (8.06) | Trioxane (10.66) | Thiourea (4.51) | Light yellow solid: 9.5, 68 |
| 3 | Z-Hydroxyacetophenone (6.8) | Trioxane (4.5) | Thiourea (3.8) | Yellow solid; 3.8, 27 |
| 4 | Z-Hydroxyacetophenone (6.8) | Trioxane (4.5) | Thiourea (7.6) | Viscous yellow oil; 5.2, 29 |
| 5 | 2'-Hydroxyacetophenone (13.6) | Trioxane (4.5) | Thiourea (7.6) | Yellow oil; 2.0, 8 |
| 6 | 2'-Hydroxyacetophenone (13.6) | Trioxane (9) | Thiourea (3.8) | Orange oil; 5.8, 23 |
| 7 | 2'-Hydroxyacetophenone (13.6) | Trioxane (4.5) | Thiourea (7.6) | Yellow-orange solid; 0.98, <5 |
| 8 | 2'-Hydroxyacetophenone (6.8) | Trioxane (9) | Thiourea (7.6) | Yellow solid; 6.7, 30 |
| 9 | O-Methylsalicylic acid (7.61) | Trioxane (9) | Thiourea (3.81) | Colorless viscous oil; 11.3, 57 |
| 10 | 2-Hydroxy-1-naphthoic acid (9.4) | Trioxane (9) | Thiourea (3.81) | White solid; 10.3, 72 |
| 11 | 4-Hydroxybenzenesulfonic acid (65 wt % aqueous solution, 13.4)[a] | Trioxane (9) | Thiourea (3.81) | White solid; 12, 57 |
| 12 | 1-Naphthol (8.65) | Troxane (10.8) | Thiourea (4.56) | Brown solid 6.6, 27 |
| 13 | 4-Hydroxybenzoic acid (6.91) | Trioxane (9) | Thiourea (3.81) | Light tan solid; 5, 25 |
| 14 | Mercaptosalicylic acid (7.7) | Trioxane (9) | Thiourea (3.81) | White solid; 6.7, 33 |
| 15 | 2'-Hydroxypropiophenone (7.5) | Trioxane (9) | Thiourea (3.81) | Light yellow solid; 6.2, 31 |
| 16 | 2'-Hydroxypropiophenone (7.5)[b] | Trioxane (9) | Thiourea (3.81) | Yellow solid; 6.2, 31 |
| 17 | 2',4'-Dihydroxypropiophenone (4.15) | Trioxane (4.5) | Thiourea (1.9) | Light yellow powder; 4.6, 44 |
| 18 | 2,4'-Dihydroxyacetophenone (7.6) | Trioxane (9) | Thiourea (3.81) | Light tan powder; 13.46, 66 |
| 19 | 2'-Hydroxypropiophenone (7.5) | Trioxane (9) | Thiosemicarbazide (4.56) | Light brown resinous solid; 9.54, 45 |
| 20 | 1-Naphthol (7.5)[c] | 37 wt % Formaldehyde in water (39) | Thiourea (3.95) | Reddish brown solid; 8.26 g |
| 21 | 1-Naphthol (9)[c] | 37 wt % Formaldehyde in water (47) | Thiosemicarbazide (5.69) | Light brown powder; 16.7 g |

[a]Refluxed for 2.5 hours
[b]Used 1.2 mL of 2M sulfuric acid/mmol of carbonyl compound as the catalyst/solvent
[c]mole ratio of 1-naphthol/formaldehyde/thiourea was 1:10:1. Reaction mixture was heated at 85–90° C. for 0.5 hours and no mineral acid catalyst/solvent was used.

A rectangular SS-304 mill finish coupon, 12.5 inches (32 cm) long, 3 inches (8 cm) wide, and 0.015 inches (0.4 mm) thick (available from Metal Samples Inc., Munford, Ala.) was rolled into a cylinder of about 3 inches (7.6 cm) long and about 3.6 inches (9 cm) in diameter, such that it would fit snugly along the walls of a 1-liter Monel autoclave. A coating candidate was dissolved in 3 wt % aqueous NaOH solutions to prepare 2 wt % solutions of the scale prevention agents. These solutions were applied manually on both sides of the coupon with a brush and were allowed to dry overnight under ambient air.

Into a 1-liter Monel autoclave was placed the SS-304 coupon coated with the scale prevention agent. The autoclave was sealed and subjected to three cycles of evacuation followed by nitrogen purge. After evacuating the autoclave again, a do water solution of 0.66 g of hydroxypropyl cellulose, sold by Dow Chemical Co. as "Methocell E50" in 450 mL of deaerated demineralized water was sucked into the autoclave. The pressure inside the autoclave was brought to atmospheric by admitting nitrogen.

Meanwhile, about 225 g (about 0.5 mole) of vinyl chloride was condensed from a VCM lecture bottle into a dry ice-cooled overhead VCM charging bomb. The VCM was charged into the autoclave under an overhead nitrogen pressure of 80 psi (553 kPa). Excess nitrogen pressure was carefully vented until the final equilibrium pressure of about 35 psi (241 kPa) at a temperature of about 16 to 18° C. was attained. The initiator, 0.7 mL of 75 wt % tert-butylperoxyneodecanoate in odorless mineral spirits, sold as "Luperox 10M-75" by Elf Atochem N. A., was injected via a septum and the mixture was agitated at about 500 rpm. The reaction mixture was heated at a uniform rate over about 45 min. until the internal reactor temperature reached 62° C. After stirring for 5 hours, the heat was turned off, the excess vinyl chloride was vented off, and the PVC water slurry was filtered. The PVC obtained was air dried at room temperature to a constant weight. It was tested for lightness and yellowness (ASTM E1164- standard practice for obtaining spectrophotometric data for object color evaluation). Table 2 gives the scale prevention agents tested and the results:

TABLE 2

| Scale Prevention Agent (Example No.) | PVC Yield (g) | Lightness (L) | Yellowness Index (YI) | Comments |
| --- | --- | --- | --- | --- |
| 23 | 187 | 93.57 | 7.07 | No fouling on inner wall of coupon |
| 1 | 164 | 97.02 | 3.84 | No fouling on inner wall. Better particle morphology than Ex 23 |
| 11 | 197 | 97.47 | 1.31 | No fouling on inner wall Better particle morphology than Ex 23 |
| 14 | 182 | 96.74 | 1.61 | No fouling on inner wall of coupon Better particle morphology than Ex 23 |
| None | 185 | 96.92 | 2.19 | Fouling on inner wall of coupon |

In Table 2, 100 is a perfect lightness score and 0 is a perfect yellowness score. Table 2 shows that the terpolymers of this invention (Examples 1, 11, and 14) produced PVC comparable in yield and scale-prevention performance to the scale prevention agent of Example 23, but superior in lightness and yellowness characteristics.

EXAMPLE 25

Suspension Polymerization of Vinyl Chloride, General Procedure

A 500 mL EZE SS-316 autoclave equipped with a cooling jacket and a stirrer (from Autoclave Engineers) was coated completely on its inner surfaces with the coating solution prepared above. The autoclave was sealed and subjected to three cycles of evacuation followed by nitrogen purge. After evacuating the autoclave again, a water solution of 0.1 g of "Methocell E50" in 190 mL of deaerated demineralized water was sucked into the autoclave. Then 18 mL of a 1% poly(vinyl alcohol) (80% hydrolyzed; Aldrich) in degassed, demineralized water was introduced via a septum into the autoclave. The autoclave was evacuated again briefly without being stirred and cooled to about 5° C. Vinyl chloride gas was condensed into the autoclave with stirring until ¼ lb (113 g) of monomer had been transferred. When the internal pressure was below 20 psig, the polymerization initiator (0.15 mL of 75 wt % "Luperox 10M-75") was syringed out and injected into the autoclave via a septum, and the mixture was agitated at 500 rpm. The coolant fluid circulation to the reactor jacket was stopped and another circulating bath pre-heated to about 72° C was connected to the reactor jacket. The reactor temperature was set to 62° C. on the control tower. The internal reactor temperature reached 62° C. in about 0.5 h. After being stirred for 5 hours, heating was turned off, the excess vinyl chloride was vented off, and the PVC water slurry was filtered. The PVC obtained was air dried at room temperature to a constant weight. It was tested for lightness and yellowness (ASTM E1164). Results obtained in evaluation of several novel coating candidates are shown in Table 3. To determine PVC resin color only one coating candidate was coated on the reactor wall. The color results are shown in Table 4. In Table 4, 100 is a perfect lightness score and 0 is a perfect yellowness score. The table shows that terpolymers used in this invention produced PVC comparable in yield and scale-prevention performance to the commercial scale prevention agent (Example 41), but superior in lightness (L) and yellowness characteristics (lower "b" value).

EXAMPLE 26

Vinyl chloride polymerization was carried out using the general procedure outlined in Example 25, but no scale prevention agent was used.

EXAMPLES 27 to 41

Vinyl chloride polymerizations were carried out according to the general procedure outlined in Example 25 and many of the scale prevention agents described in the Examples. In some experiments, two or more coatings were applied on different sections of the reactor wall.

EXAMPLE 42 (Comparative)

Vinyl chloride polymerization was carried out using the general procedure outlined in EXAMPLE 25 and the scale prevention agent described in Example 22.

Tables 3 and 4 give the results of the vinyl chloride polymerizations of Examples 26 to 42. All reactor coatings were formulated in an 80/20 misture of 2 wt % aqueous NaOH/ethanol unless otherwise indicated.

TABLE 3

| Polymerization | Coating | Fouling Observations | |
|---|---|---|---|
| Example | Example(s) | Solution | Interfacial |
| 26 | No Coating | High | High |
| 27 | 2[a] | Medium | High |
|  | 11[a] | Medium | High |
| 28 | 3 | Low | Medium |
|  | 4 | Low | Medium |
|  | 2 | Low | Medium |
|  | 5 | Low | Medium |
| 29 | 6 | Low | Medium |
|  | 7 | Low | Medium |
|  | 8 | Low | Medium |
|  | 2 | Low | High |
| 30 | 9 | Medium | Medium |
| 31 | 15[b] | None | None |
|  | 15[c] | None | Very Low |
| 32 | 15[d] | Low | None |
|  | 15[e] | Very Low | None |
| 33 | 15[f] | None | None |
| 34 | 15[g] | Medium | Low |

[a]Formulated in 2 wt % aqueous NaOH.
[b]Coating solution contained an equal weight of "Bio-Soft D40" anionic surfactant (Stepan).
[c]Coating solution contained an equal weight of "Emkal BNS" anionic surfactant (Emkay).
[d]Coating solution contained equal weights of "Bio-Soft D40" anionic surfactant and "Ludox SM-30" coloidal silica.
[e]Coating solution contained an equal weight of "Ludox SM-30" coloidal silica.
[f]Coating solution contained an equal weight of "Igepal CO-880" nonionic surfactant (Rhone Poulenc).
[g]Coating solution contained an equal weight of "Surfonic JL-80X" non-ionic surfactant (Huntsman)

We claim:

1. A terpolymer consisting essentially of the acid catalyzed condensation reaction product of
    (A) an aromatic compound having the formula

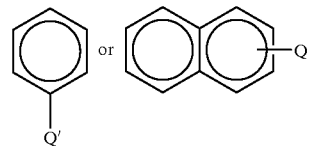

Q' where Q is OR' or SR, Q' is OR or SR, R is hydrogen or R', and R' is alkyl from $C_1$ to $C_{15}$, or aryl, alkaryl, or aralkyl from $C_8$ to $C_{15}$;
    (B) about 0.1 to about 10 moles of a carbonyl compound per mole of said aromatic compound, wherein said carbonyl compound is an aliphatic mono or dialdehyde, an aromatic aldehyde, or an aliphatic mono or diketone; and
    (C) about 0.1 to about 10 moles of thiosemicarbazide per mole of said aromatic compound.

2. A terpolymer according to claim 1, wherein Q' is OR and R is hydrogen.

3. A terpolymer according to claim 1 wherein Q is OR' and R' is alkyl from $C_1$ to $C_{15}$.

4. A terpolymer according to claim 1 wherein said carbonyl compound is a mono or dialdehyde.

5. A terpolymer according to claim 1 wherein said carbonyl compound is an aromatic aldehyde.

6. A terpolymer according to claim 1 wherein said carbonyl compound is an aliphatic mono or diketone.

7. A terpolymer according to claim 1 wherein said carbonyl compound is formaldehyde or an oligomer thereof.

8. A terpolymer according to claim 1 wherein said aromatic compound is 1-naphthol and said carbonyl compound is trioxane.

9. A terpolymer according to claim 1 wherein said aromatic compound is 1-naphthol and said carbonyl compound is formaldehyde.

10. A terpolymer consisting essentially of the acid catalyzed condensation reaction product of

TABLE 4

| Polymerization | Coating | Fouling Observations | | | PVC yield | PVC Resin Color | | |
|---|---|---|---|---|---|---|---|---|
| Example | Example | Solution | Interfacial | Comments | (g) | L | a | b |
| 35 | 19 | v.low | None | Fouling above interface | 81.5 | 92.998 | 0.822 | 3.609 |
| 36 | 15[a] | None | Vert. low | Clean, shiny walls. Some roughness in coated area. | 74.1 | 96.956 | −0.756 | 2.573 |
| 37 | 16[a] | None | None | Fouling above interface | 77.6 | 96.501 | −0.567 | 2.587 |
| 38 | 17 | None | Very. low | Dark amber solution. clean shiny walls. | 77.2 | 92.062 | 0.043 | 5.025 |
| 39 | 19 | None | None | Very low fouling above interface | 77.6 | 97.075 | −0.514 | 1.989 |
| 40 | 20 | None | None | No fouling above interface. | 74.3 | 92.861 | −0.758 | 4.949 |
| 41 | 21 | None | None | No fouling above interface | 74.0 | NA | NA | NA |
| 42 | 22[b] | None | None | Clean and shiny below interface. Red brown stain above interface. | 82.2 | 92.473 | −0.567 | 6.331 |

[a]Coating solution contained an equal weight of cetyltrimethylammonium chloride cationic surfactant (Sachem).
[b]Supplied by European Vinyls Corporation.

Tables 3 and 4 show that the terpolymers of this invention are as effective as commercial products in preventing scale and in yield, but produce PVC that is lighter and less yellow.

(A) an aromatic compound having the general formula

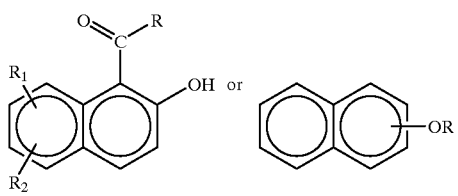

where R is hydrogen, alkyl from $C_2$ to $C_{15}$, or aryl, alkaryl, or aralkyl from $C_8$ to $C_{15}$, each $R_1$ is independently selected from the group consisting of OH, R, $SO_3R$, and $CO_2R$, and each $R_2$ is independently selected from the group consisting of H, OH, alkyl from $C_1$ to $C_8$, aryl, alkaryl, or aralkyl from $C_8$ to $C_{15}$, $SO_3R_1$, $CO_2R_1$, SH, SR, haloalkyl from $C_1$ to $C_{15}$, alkoxyaryl, naphthyl, and polycyclic aryl from $C_8$ to $C_{15}$;

(B) about 0.1 to about 10 moles of a carbonyl compound per mole of said aromatic compound, wherein said carbonyl compound is an aliphatic mono or dialdehyde, an aromatic aldehyde, or an aliphatic mono or diketone; and (C) about 0.1 to about 10 moles of thiourea per mole of said aromatic compound.

11. A terpolymer according to claim 10, wherein said carbonyl compound is formaldehyde or an oligomer thereof.

12. A composition comprising
(A) a terpolymer consisting essentially of
the acid catalyzed condensation reaction product of
(1) naphthol;
(2) about 0.1 to about 10 moles of a carbonyl compound per mole of said naphthol, wherein said carbonyl compound is an alphatic mono or dialdehyde, an aromatic aldehyde, or an aliphatic mono or diketone; and
(3) about 0.1 to about 10 moles of a thiourea per mole of said naphthol;
(B) about 10 to about 500 wt % of an inorganic binder; and
(C) about 1 to about 100 wt % of a surface active agent.

13. A composition according to claim 12 wherein said inorganic binder is colloidal silica.

14. A composition according to claim 12 wherein said surface active agent is polyvinyl alcohol.

15. A composition according to claim 12 wherein said naphthol is 1-naphthol.

16. A composition according to claim 12 wherein said carbonyl compound is formaldehyde or an oligomer thereof.

17. A composition comprising a vinyl monomer and about 0.0001 to about 0.01 wt % of a terpolymer consisting essentially of the acid catalyzed condensation reaction product of
(A) an aromatic compound selected from the group consisting of

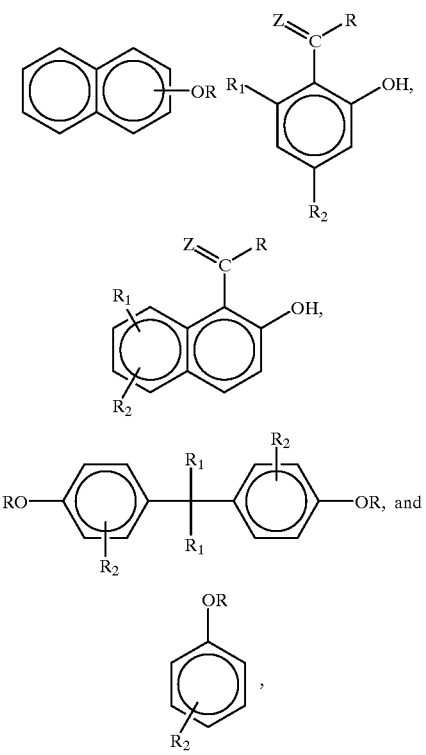

where R is hydrogen, alkyl from $C_1$ to $C_{15}$, or aryl, alkaryl, or aralkyl from $C_8$ to $C_{15}$, Z is O or NOH, each $R_1$ is independently selected from OH, R, $SO_3R$, and $CO_2R$, and each $R_2$ is independently selected from $R_1$, SH, SR, haloalkyl from $C_1$ to $C_{15}$, and alkoxyaryl, naphthyl, and polycyclic aryl from $C_8$ to $C_{15}$;

(B) about 0.1 to about 10 moles of a carbonyl compound per mole of said aromatic compound, wherein said carbonyl compound is an aliphatic mono or dialdehyde, an aromatic aldehyde, or an aliphatic mono or diketone; and (C) about 0.1 to about 10 moles of a thiourea per mole of said aromatic compound.

18. A terpolymer according to claim 17 wherein said aromatic compound is 1-naphthol.

19. A terpolymer according to claim 17 wherein carbonyl compound is formaldehyde or an oligomer thereof.

20. A terpolymer according to claim 17 wherein said thiourea is thiourea or thiosemicarbazide.

* * * * *

UNITED STATES PATENT AND TRADEMARK OFFICE
CERTIFICATE OF CORRECTION

PATENT NO. : 6,300,427 B1
DATED : October 9, 2001
INVENTOR(S) : Ramesh Krishnamurti et al.

It is certified that error appears in the above-identified patent and that said Letters Patent is hereby corrected as shown below:

Column 10,
Line 13, delete "Q" and substitute -- Q' --
Line 13, delete "Q'" and substitute -- Q --

Signed and Sealed this

Eighth Day of October, 2002

Attest:

Attesting Officer

JAMES E. ROGAN
Director of the United States Patent and Trademark Office